United States Patent

[11] 3,546,989

| [72] | Inventor | Isaj Gutman<br>Harrow, England |
|------|----------|--------------------------------|
| [21] | Appl. No. | 823,076 |
| [22] | Filed | May 8, 1969 |
| [45] | Patented | Dec. 15, 1970 |
| [73] | Assignees | English Numbering Machines Limited<br>Enfield, England;<br>Flexico France<br>Paris, France, a part interest |
| [32] | Priority | May 9, 1968 |
| [33] | | Great Britain |
| [31] | | 22,075/68 |

[54] CUTTER ARRANGEMENTS
12 Claims, 6 Drawing Figs.

[52] U.S. Cl. .................................................. 83/13,
83/435, 83/436, 83/449, 83/471, 83/925
[51] Int. Cl. .................................................. B26d 7/06
[50] Field of Search .......................................... 83/13, 19,
409, 435, 433, 436, 444, 449, 471, 921, 925;
18/14a, 14c, 14m, 14s; 264/95, 167, 177

[56] References Cited
UNITED STATES PATENTS

| 3,010,351 | 11/1961 | Firing ........................... | 83/921X |
| 3,320,340 | 5/1967 | Luca ............................. | 264/95 |
| 3,415,147 | 12/1968 | Frydryk ........................ | 83/435X |

Primary Examiner—William S. Lawson
Attorney—Hill, Sherman, Meroni, Gross & Simpson ABSTRACT: The cutting apparatus is designed to cut along a longitudinal bead of a flat film structure of great length, in particular a tubular structure obtained by extrusion of flexible plastic material and comprising, on its inner face, two parallel longitudinal ribs, respectively male and female, engaged one in the other by flattening of the tube and thus forming an overthick bead projecting on at least one of the faces of the flattened tube. The film structure is guided by its bead past the cutting tool which cuts it along this bead.

INVENTOR
Isaj Gutman

ATTORNEYS

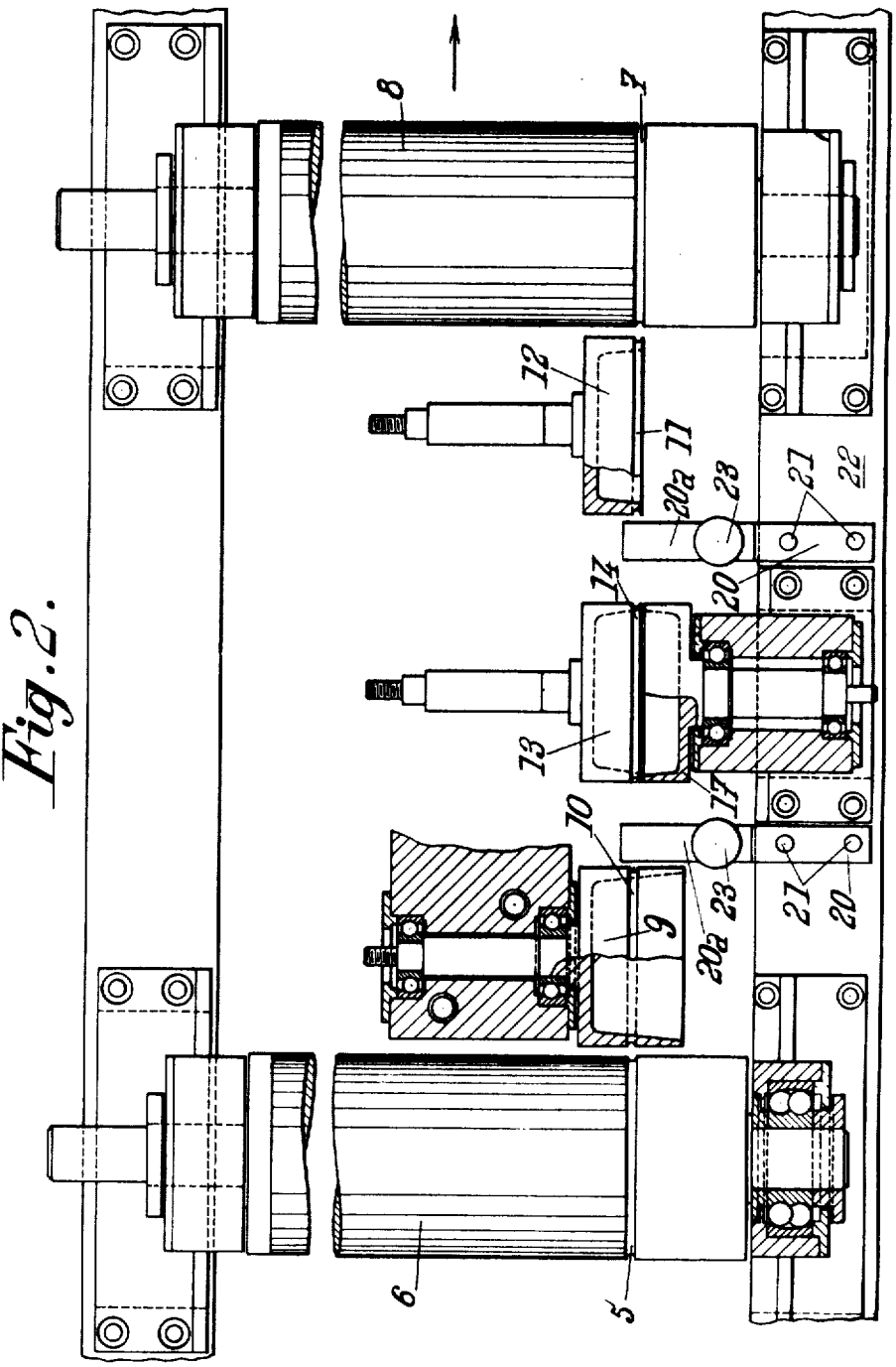

INVENTOR
Isaj Gutman

CUTTER ARRANGEMENTS

This invention relates to a method and apparatus for cutting, along a longitudinal bead, a flat film structure of great length, made of a flexible plastic material, in particular by extrusion.

The flat film structure in question can be in the form of a film of single thickness, in which the longitudinal thin marginal bands, which have a greater or lesser width, extend respectively along each side of the bead; the method and apparatus according to the invention can in particular be used for cutting, with precision, from this structure, one of the marginal bands, as a rule the one of lesser width.

A particularly advantageous application of the invention is for cutting the marginal portions of flexible closurebands comprising profiled ribs, along one side of these ribs in order to be able to equip them with a slider with the aid of which one can easily separate the two complementary ribs of the closure engaged one in the other, and reengage these two ribs one in the other, at will.

Certain packaging bags are manufactured from a thin walled tube obtained by the extrusion of plastic material, in particular thermoplastic material, with two complementary parallel ribs on its interior face, these ribs being engaged one in the other by flattening of the tube.

In this state, the two ribs (one male and the other female) of the closure, engaged one in the other, divide the initial tube into two secondary tubes of unequal cross sections smaller than the cross section of the initial tube; the larger secondary tube will constitute the walls of the future bag whereas the smaller secondary tube, when it is wished to subsequently mount a slider straddling these two ribs, must be removed with great precision near to the ribs which form an overthick bead projecting out from the opposite faces of the flattened initial tube.

The invention is directed especially towards a cutting apparatus for continuously cutting off, with great precision near to the ribs engaged one in the other, the secondary tube of smaller cross section.

For this purpose, the method according to this invention comprises guiding the film structure of the type in question by its bead, while passing this film structure, under tension, past the tool which cuts it along this bead.

The apparatus according to this invention is characterized in that it comprises, before and after the cutting tool, guide passages for the bead in question, and means for passing, from the upstream guide passage to the downstream guide passage, without the formation of folds, the structure of the type in question past the cutting tool.

According to an advantageous embodiment of the invention, a plurality of successive guide passages are provided, before and after the cutting tool, aligned one behind the other, some of which can have the form of elongated corridors.

At least one of the guide passages is advantageously constituted by a portion of a surface of revolution of a roller applied against one of the faces of the film structure and against at least one of the sides of the bead.

In a particularly simple embodiment, this portion of the guide passage is constituted by a peripheral groove formed in the roller against which the film structure bears.

Advantageously, the guide passage, formed by a peripherally grooved roller or two coaxial and parallel rollers, against the neighbouring flanks of which the film structure bears by one of its faces, is completed by one or two corresponding counter-rollers which bear against the other face of this structure.

It is advantageous to drive in rotation, in synchronism, certain rollers and their corresponding counter-rollers both upstream and downstream of the cutting tool, in order to ensure the progression of the structure without folds in the guide passages and past the cutting tool.

This cutting tool advantageously comprises at least one support roller for the flat structure to be cut and a blade in the form of a disc, preferably made of tungsten carbide and driven in rotation, about an axis at least approximately parallel to the axis of the support roller, the periphery of the disc of the blade projecting beyond the periphery of the support roller.

In addition, it is advantageous to provide, on the support of the blade of the cutting tool, and above the support roller, means for preventing the bead from moving away, during cutting, from the support roller.

Preferably, the support roller has, at its end which is near to the cutting blade, an annular groove for receiving part of the bead of the film structure to be cut.

Furthermore, the position of the blade is preferably adjustable in the direction of the axis of this support roller, with a view to adjusting its position to suit beads of different cross sections.

In general it is appropriate to dispose, on the side of the blade of the cutting tool which is opposed to the side where the support roller is located, a roller coaxial with the support roller and adapted to rotate independently of the support roller and serving as support for the portion of the film structure cut off by the blade of the cutting tool; this cut off portion can be removed downstream of this coaxial roller, transversely to the plane of the structure, and can, for example, be wound on a take up spool provided for this purpose.

Other characteristics and advantages of the apparatus according to this invention will become apparent from the embodiment described hereafter and illustrated in the accompanying drawings, in which:

FIG. 2 shows in plan, on a larger scale, certain elements of the lower portion of the cutting apparatus shown in FIG. 1;

Figure 4:
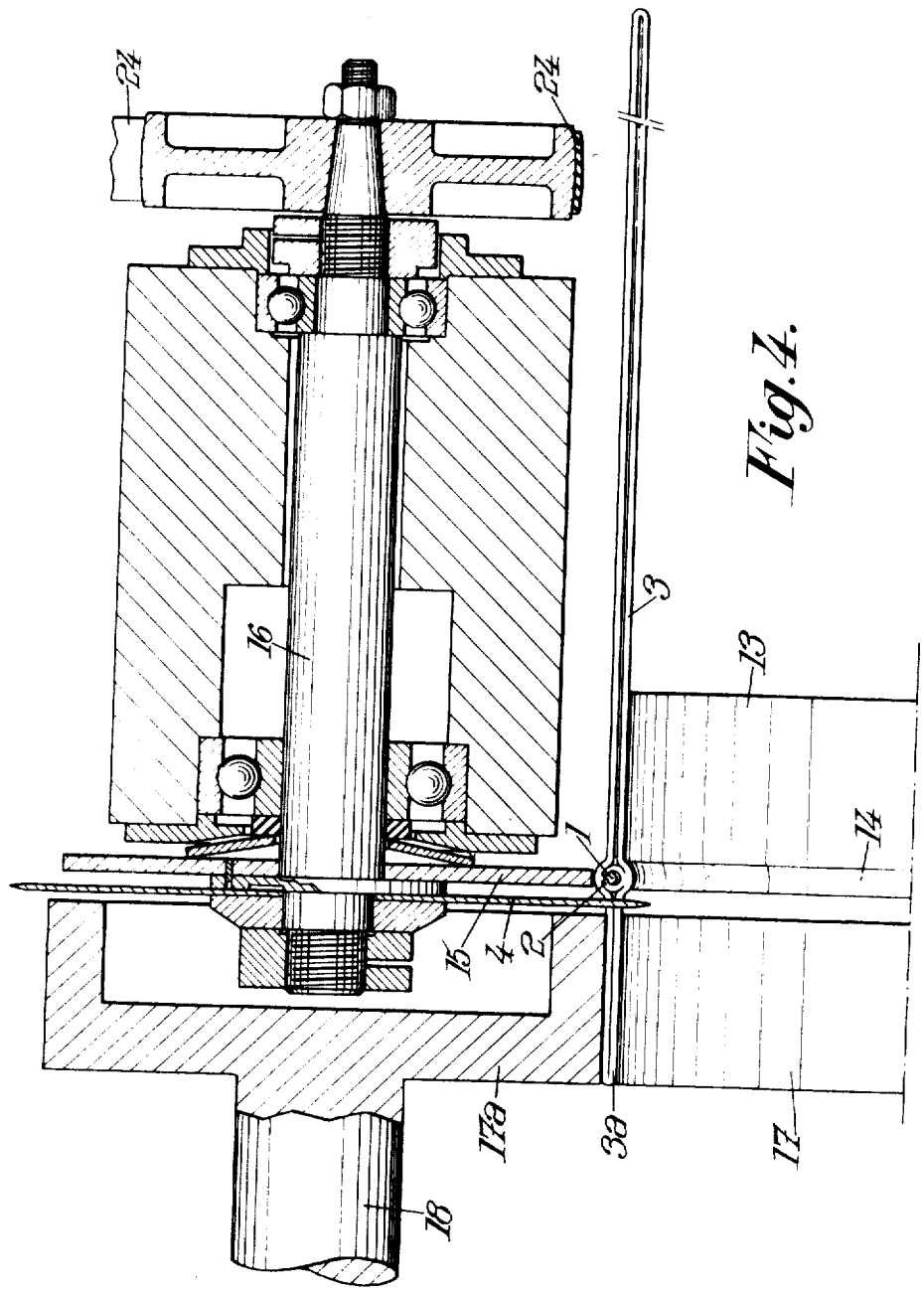
FIG. 4 shows on a larger scale the same apparatus in section along IV–IV of FIG. 1.

It has already been proposed to use, for the manufacture of packaging bags provided with a closure that one can open and reclose at will, a tubular film obtained by extrusion of a thermoplastic material, this tubular film having, on its interior face, two parallel ribs, namely a male rib 1 and a female rib 2 (see FIG. 4), adapted to be engaged one in the other by flattening this tubular structure.

Such an engagement of the ribs 1 and 2 divides the initial tube into two secondary tubes 3 and 3a of smaller cross sections; the larger tube 3 constitutes the walls of the future bag, whereas the smaller tube 3a must be cut off when it is wished to be able to open the closure constituted by the male and female ribs 1 and 2 adjoining the walls of the larger tube 3.

Each individual bag is obtained, in a known manner, by cutting the tubular structure 1, 2, 3 transversely into sections, and by welding the two superimposed walls of the flattened tube against each other along the lines of cut.

The opening and the closing of these bags are generally obtained by disengaging and reengaging the ribs 1 and 2, directly by means of one's fingers.

When it is wished to mount a slider on such a bag, straddling the ribs 1 and 2, in order to make its opening and closing easier, it is necessary to remove the secondary tube 3a with great precision, near the ribs 1 and 2.

The film structure can be obtained in a single piece — with the wall portions 3 and 3a formed integrally with the parallel male and female ribs 1 and 2 which project from the interior face of the tube and separate the wall portions 3 and 3a — by the simple extrusion of a thermoplastic material such as polyethylene through an annular dye of appropriate profile.

The thickness of the wall 3 or 3a of the tube can be about 0.03 millimeters and the height to which the ribs 1 and 2 project from the interior face of this wall about 1 millimeter.

When the male and female ribs 1 and 2 of such a structure are engaged one in the other by flattening of the tube, the amount by which the bead, resulting from the union of the two ribs, projects out from the opposite exterior walls of the flattened tube is small, and as the whole structure formed by flattening of the tube is very flexible, it will be appreciated that it is difficult to cut off the portion 3a from the portion 3 adjoining the bead, with the desired precision along this bead.

This cutting off of the portion 3a is rendered still more delicate by the fact that this portion 3a is in two superimposed thicknesses, apt to slide on one another during the cutting operation.

Now, any irregularity in the removal of the marginal portion 3a from the bead 1, 2 would compromise the sliding of the slider which is to be mounted straddling the ribs 1 and 2 of the future bag.

The object of this invention is to ensure the cutting off of the portion 3a with great precision along the bead 1, 2.

For this purpose, and in accordance with the invention, the bead, constituted by the two ribs 1 and 2 engaged one in the other and projecting towards the interior on both sides of the tubular structure 3, 3a, is used for guiding this structure during its pass under the cutting tool, in the present case under a blade 4.

This guiding is ensured each time in front of and behind the blade 4 by a guide passage or, better still, by a plurality of successive guide passages, aligned behind one another, means being moreover provided for passing the tubular structure, in the flat state and without the formation of folds, from the upstream guide passages to the downstream guide passages.

The guide passage, upstream of the blade 4, can be constituted by a peripheral groove 5, formed in a roller 6 which supports the tubular structure by the lower face of its double thick flat portions 3, 3a.

The guiding can be further improved by a counter-roller 6a bearing on the upper face of the same structure and in which is provided a similar peripheral groove which, on the line of contact of the two rollers 6a or 6, coincides with the groove 5 of this latter roller 6.

Downstream of the blade 4, the guide passage can be constituted by grooves 7 similar to the grooves 5, and formed in rollers 8 and 8a similar to the rollers 6 and 6a.

Between the blade 4 and the pair of rollers 6 and 6a, and between the blade 4 and the pair of rollers 8 and 8a, are advantageously provided supplementary guide passages for further improving the alinement of the tubular structure by its bead 1, 2 as it passes through the cutting apparatus. These supplementary guide passages do not have to participate in the progression of the tubular structure through the apparatus and can be positioned on the frame of the apparatus with great precision.

One of these supplementary guide passages, provided between the rollers 6 and 6a and the blade 4, comprises an auxiliary roller 9 with a peripheral groove 10 for receiving the bead 1, 2 of the tubular structure which bears on this auxiliary roller, and an auxiliary counter-roller 9a which bears on the opposite surface of the structure 3a thus pressing it against the auxiliary roller 9. Between the blade 4 and the pair of rollers 8, 8a is provided another supplementary guide passage comprising an auxiliary roller 12 and an auxiliary counter-roller 12a, corresponding to the auxiliary rollers 9 and 9a.

The blade 4 is advantageously constituted by a disc, preferably made of tungsten carbide, driven in rotation about an axis at least approximately parallel to the axes of the various rollers 6, 8, 9 and 12.

Under the blade 4 is provided a support roller 13, this roller having at its end an annular groove 14 for receiving the bead 1, 2 in order to guide the film structure 3 which bears on the periphery of this roller. The lower portion of the blade 4 projects slightly beyond the periphery of the groove 14 (see FIG. 4).

On the support of the blade 4 is provided a bearing member which touches lightly the top of the bead 1, 2 during the cutting in order to prevent this bead from moving away from the bottom of the groove 14 of this roller.

This member, in the embodiment represented, is constituted by a disc 15, fixed on the shaft 16 driving the blade 4. This disc 15 has, at its periphery, a thickness comparable to that of the bead 1, 2, and it is polished in the region where, during the cutting, it touches lightly the bead.

On the other side of the blade 4, there is disposed a roller 17 coaxial with, and of the same diameter as, the roller 13; the roller 17 can rotate independently of the roller 13 and serves as a support for the portion 3a cut off from the structure 1, 2, 3.

The roller 17 coacts with a counter-roller 17a which rotates independently of the blade 4 and whose shaft 18 is coaxial with the shaft 16 of this blade 4.

Figure 3:
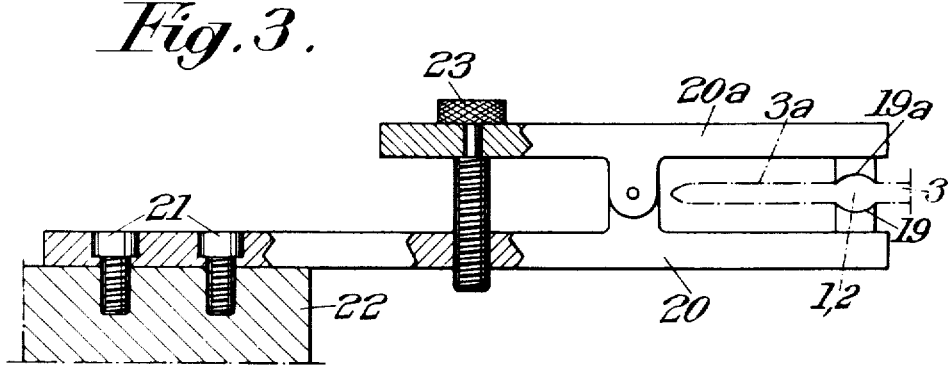
FIG. 3 shows separately, in elevation, a guiding device of the same apparatus.

In order to improve further the guiding directly before and after the blade 4, it is advantageous to provide, between the group of rollers 13, 17 and 17a and each of the two groups of rollers 9, 9a and 12, 12a, smooth stationary guide corridors, made of a material having good properties of sliding with respect to the material constituting the bead 1, 2, for example made of a plastic material. These corridors are advantageously constituted by two complementary rectilinear grooves 19 and 19a (FIG. 3), formed in the ends of the branches 20 and 20a of a nipper fixed for example by screws 21 against the frame 22 of the apparatus, so that the two fixed corridors, formed by the grooves 19 and 19a on each side of the blade 4, are aligned with the grooves 5, 7, 10, 11 and 14 on a tangent common to the various guiding rollers in which these grooves are formed.

An adjustable screw 23, acting on the branches 20 and 20a of the nipper, permits a determined separation to be maintained with precision between the ends of these branches, so that the flat structure 3, 3a can pass through the grooves 19 and 19a between the ends of the branches 20 and 20a of the nipper without excessive friction. The ends, which are made of smooth plastic material, of the branches 20 and 20a of the nipper are advantageously removable and easily replaceable on these branches.

Figure 5:
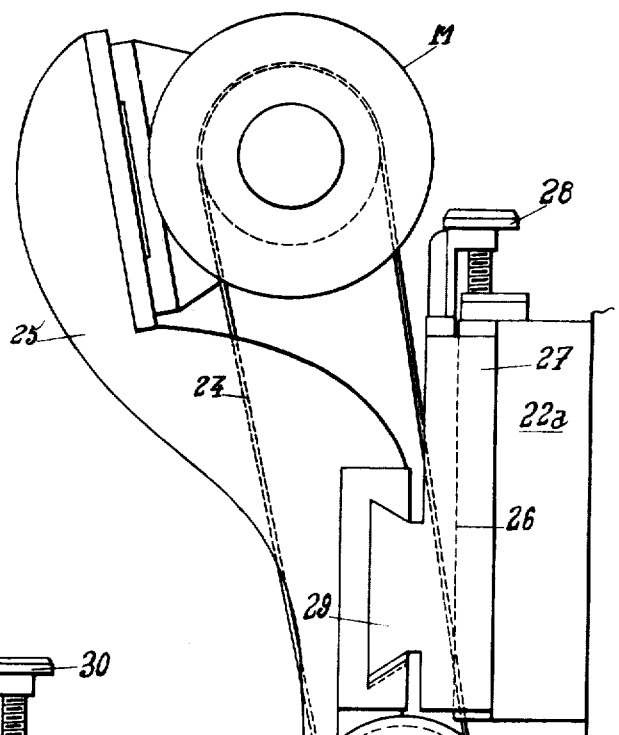
FIGS. 5 and 6 show, respectively in elevation and in plan, the cutting tool of the same apparatus.
Figure 6:
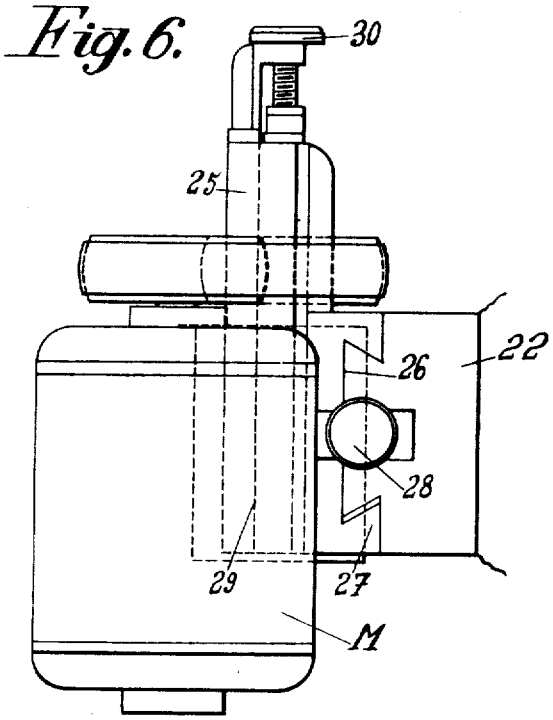

The cutting tool (FIGS. 5 and 6), comprising the rotary blade 4 and an electric motor M, driving the blade 4 in rotation, for example by the intermediary of a belt 24, comprises a rigid support 25.

The frame 22 of the apparatus has, above the rollers 9, 9a or 12, 12a, a part 22a and, on this part 22a, a plane perpendicular to the alignment of the guide passages and, on this plane, a vertical slideway 26 on which can slide an intermediate piece 27 whose position is adjustable in height with respect to the frame 22 by the intermediary of an adjusting screw 28.

The intermediate piece 27 carries in its turn a slideway 29, substantially perpendicular to the slideway 26, and on which can slide the support 25 of the cutting tool.

An adjusting screw 30 (FIG. 6) permits the position of the cutting tool to be adjusted with precision, parallel to the axes of the various rollers 6, 6a, 8, 8a, 9, 9a, 12, 12a.

The supports of the bearings of the various rollers 9, 9a, 12, 12a and 17, 17a, as well as the nippers 20, 20a, are advantageously adjustable in position on the frame 22 in a plane parallel to the plane which passes between the rollers 6, 6a and 8a.

The blade 4, when it is separating the portion 3a of the structure 21, 2, 3, has a tendency to push the bead 1, 2 and the portion 3a, separated from this bead, in two opposite directions parallel to the shaft 16 of the blade, so that the bead 1, 2 is then pushed towards the interior of the groove 14. It is thus possible to give the groove 14 a profile such that it can be used with beads 1, 2 of greater or lesser cross section, on a tube having thicker or thinner walls.

The cross section of the guide passage for the bead under the blade can then be adjusted as a function of the cross section of the bead 1, 2 and the thickness of the tube 3, 3a by means of the screws 28 and 30 which permit, respectively, to move the disc 15 towards or away from the axis of the roller 13 and to move this disc and the blade 4 axially in the direction of the shaft 16.

The shaft 18 of the roller 17a is mounted on a support which is itself adjustable on the frame 22, in the same directions as the support 25 of the cutting tool, which permits the roller 17a to participate in the adjustment of the cutting tool.

In addition, an adjustment can be provided for the roller 17 permitting this roller to be moved towards or away from the roller 14.

In this manner, the apparatus can be adjusted so that the bead 1, 2, whatever be its cross section within certain limits, remains, during the cutting off of the portion 3a of the tube, firmly applied in the bottom of the groove 14 of the roller 13.

The other guide passages of the apparatus, in particular the grooves 5, 7, 10 and 11, are provided with a cross section such that they can allow the bead 1, 2 of the greatest cross section provided for to pass through.

The various rollers, in particular the rollers 14, 17 and 17a, are made of metal which ensures good evacuation of the heat produced during the cutting operation.

Figure 1:
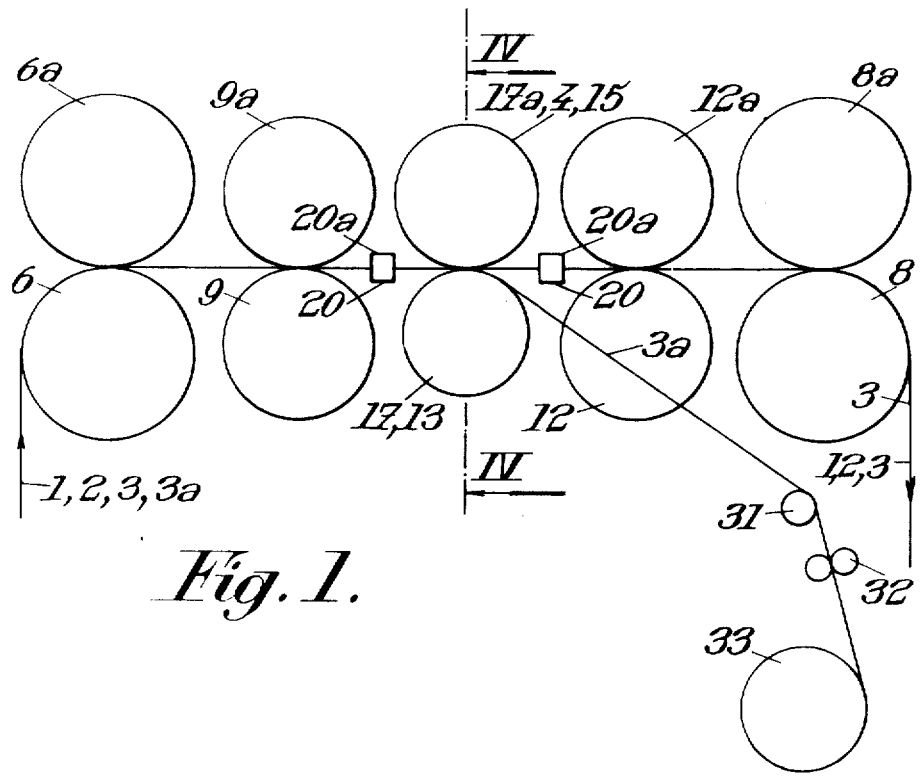
FIG. 1 shows schematically in elevation a cutting apparatus established according to the invention.

The roller 12, as shown in FIG. 2, does not extend, as the roller 9 does, beyond its groove 11, in order to free the passage for the portion 3a, cut off from the structure 1, 2, 3; this portion 3a can then be moved out of the plane of guiding, obliquely towards the bottom, as shown in FIG. 1, in front of the roller 12; this portion 3a can then bear on a roller 31 responsive to the tension, which roller adjusts the speed of rotation of a driver 32 which directs this cutoff portion 3a towards a takeup spool 33.

The rollers 17, 17a can rotate freely or can be driven in rotation at a speed appropriate to good operation of the apparatus; it is the same for the rollers 9, 9a and 12, 12a.

Various modifications and changes can be made to the apparatus described, without departing from the spirit or scope of this invention.

I claim:

1. A method for cutting, along a longitudinal bead, a flat film structure of great length, in particular a tubular structure obtained by extrusion of flexible plastic material and comprising, on its interior face, two parallel longitudinal ribs, respectively male and female, engaged one in the other by flattening of the tube and thus forming an overthick bead projecting on at least one of the faces of the flattened tube, which method comprises advancing said structure, in the longitudinal direction of its bead, past a cutting tool, guiding said structure by its bead as this structure advances past the cutting tool, and cutting said structure along its bead, with said cutting tool, as this structure passes the cutting tool.

2. Apparatus for cutting, along a longitudinal bead, a flat film structure of great length having such a longitudinal bead, comprising a cutting tool for cutting said structure along its bead, advancing means for advancing said film structure longitudinally, without the formation of folds, past said cutting tool to be cut by said cutting tool, guide passage means for the bead, disposed upstream of said cutting tool with respect to the direction of advance of said film structure, and guide passage means for the bead, disposed downstream of said cutting tool with respect to the direction of advance of said film structure, said upstream and downstream guide passage means guiding said film structure, by its bead, past said cutting tool, with the bead adjacent to said cutting tool, so that the cutting tool cuts said film structure along said bead.

3. Apparatus according to claim 2, wherein said upstream and said downstream guide passage means each comprise a plurality of successive guide passages aligned behind one another.

4. Apparatus according to claim 2, wherein at least a portion of each of said upstream and downstream guide passage means is formed by a surface of revolution forming part of a roller, which surface is applied against one of the faces of the film structure and at least one of the lateral sides of the bead projecting from that face.

5. Apparatus according to claim 4, wherein said portion is formed by a peripheral groove in said roller, against which the film structure bears.

6. Apparatus according to claim 5, wherein said roller, acting on one of the faces of the flat structure, cooperates with a counter-roller acting on the opposite face of the structure.

7. Apparatus according to claim 3, wherein said cutting tool comprises a support roller for the structure to be cut and a blade in the form of a disc driven in rotation about an axis substantially parallel to, but offset from, the axis of the support roller, the periphery of the disc extending laterally beyond the periphery of the support roller.

8. Apparatus according to claim 7, wherein said cutting tool carries a bearing member opposed to said support roller, for bearing against said bead to prevent it from moving away from the support roller during cutting.

9. Apparatus according to claim 7, wherein said support roller has, at its end neighbouring the cutting blade, an annular groove for receiving part of the bead of the film structure to be cut.

10. Apparatus according to claim 9, further comprising adjusting means for adjusting the position of the blade of the cutting tool, on the one hand parallel to the axis of the support roller, and on the other hand perpendicular to a plane parallel both to said axis and to the alignment of the guide passages for the bead.

11. Apparatus according to claim 9, further comprising a coaxial roller, coaxial with the support roller and disposed on the opposite side of the blade of the cutting tool, this coaxial roller rotating independently and serving as a support for the portion of the film structure cut off by the blade of the cutting tool.

12. Apparatus according to claim 11, further comprising adjusting means for adjusting the distance between the coaxial roller and the support roller.